April 26, 1955
H. D. UMSTOTT
2,707,109
DUAL CONTROL STEERING CONNECTION FOR MOTOR VEHICLES
Filed Jan. 7, 1952
3 Sheets-Sheet 1
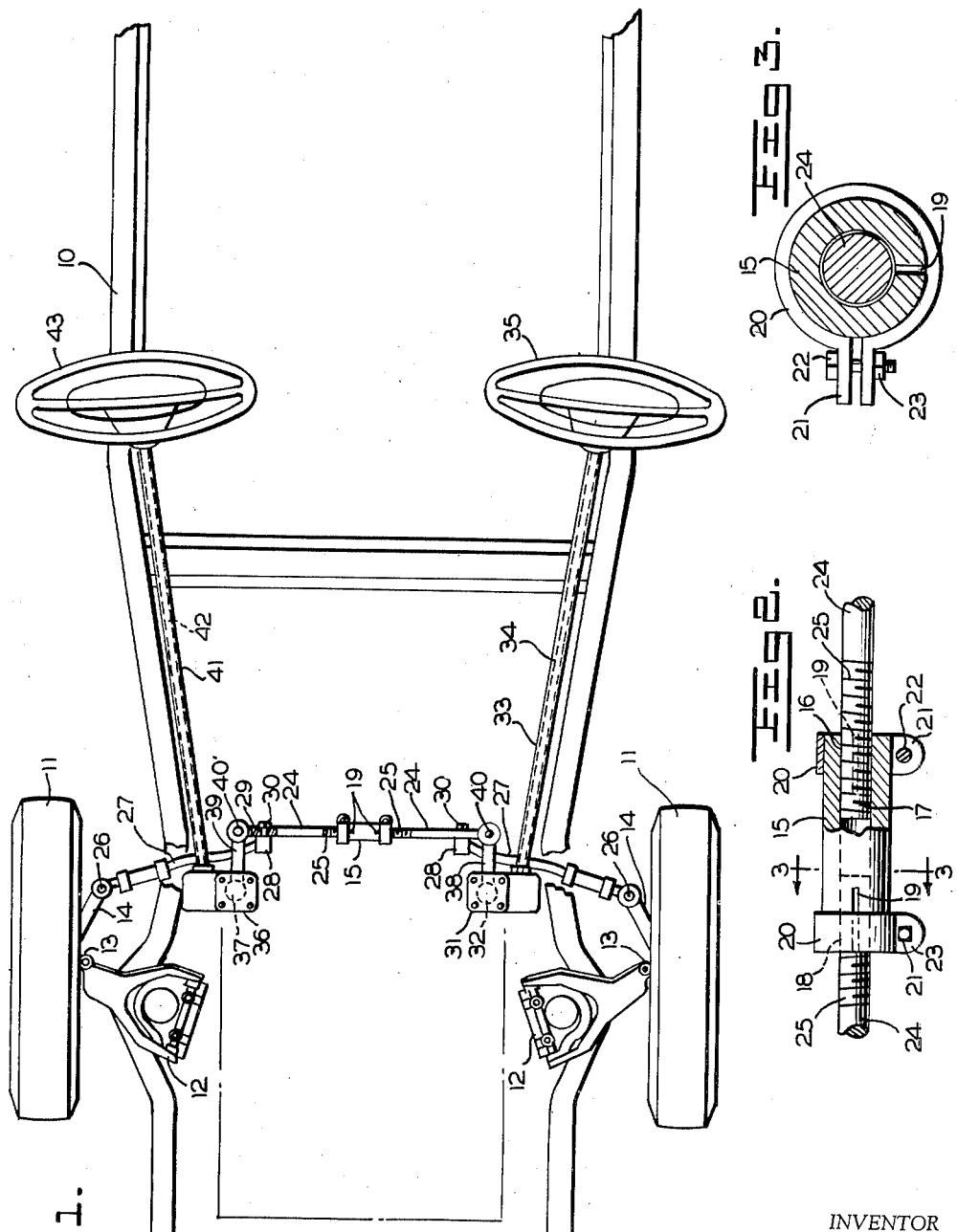
INVENTOR
HAVEN D. UMSTOTT
BY Cushman Darby Cushman
ATTORNEYS April 26, 1955     H. D. UMSTOTT     2,707,109
DUAL CONTROL STEERING CONNECTION FOR MOTOR VEHICLES
Filed Jan. 7, 1952     3 Sheets-Sheet 2
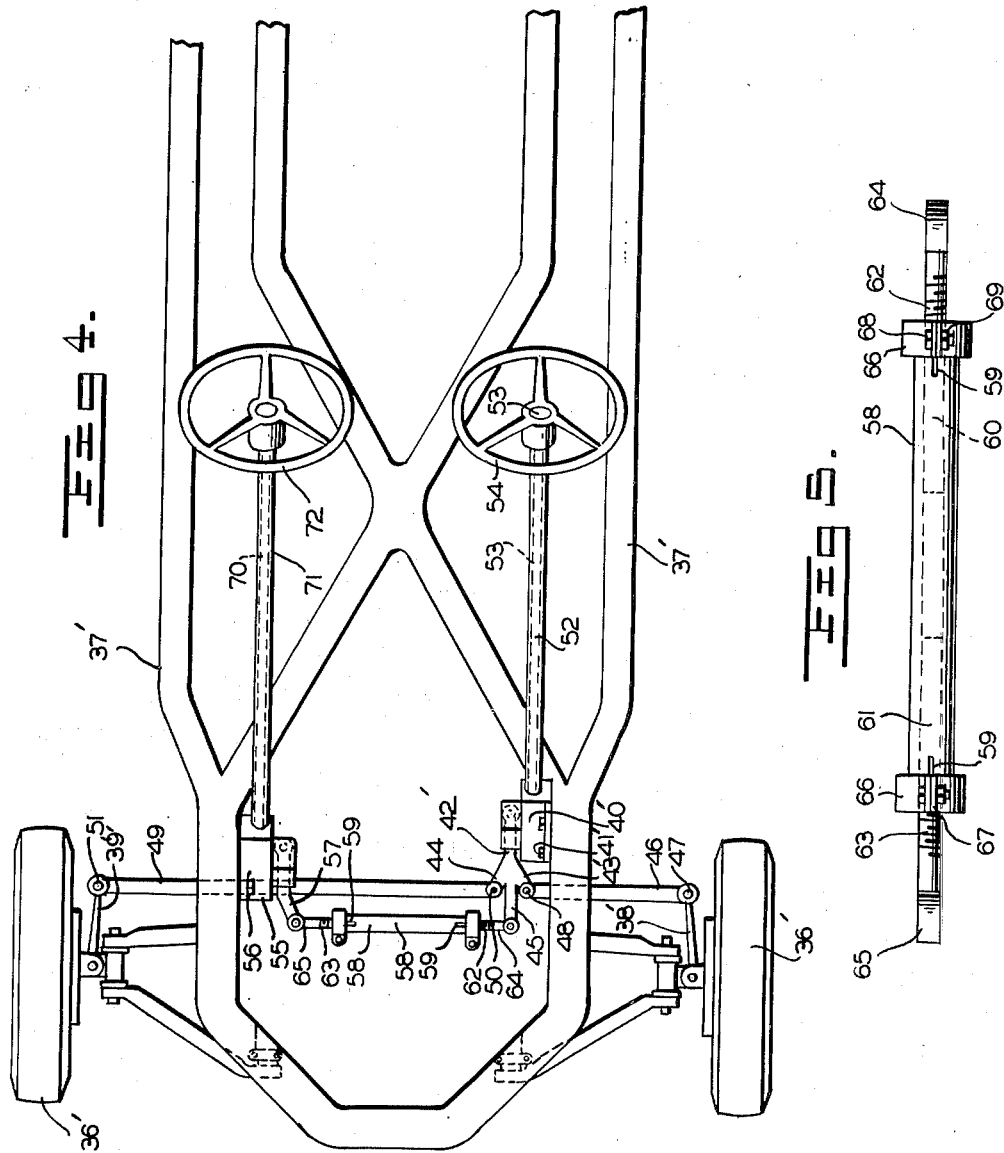
INVENTOR
HAVEN D. UMSTOTT
BY *Cushman Darby Cushman*
ATTORNEYS April 26, 1955 H. D. UMSTOTT 2,707,109
DUAL CONTROL STEERING CONNECTION FOR MOTOR VEHICLES
Filed Jan. 7, 1952 3 Sheets-Sheet 3

INVENTOR
HAVEN D. UMSTOTT

BY Cushman Darby Cushman
ATTORNEYS

__NUM__2,707,109

DUAL CONTROL STEERING CONNECTION FOR MOTOR VEHICLES

Haven D. Umstott, Washington, D. C.

Application January 7, 1952, Serial No. 265,221

3 Claims. (Cl. 280—95)

The present invention relates to an improved dual control steering mechanism for motor vehicles.

An important object is to provide means for operatively connecting the main steering wheel and the auxiliary steering wheel to the steering knuckles of the front wheels so as to normally maintain the front wheels in proper parallel alignment and to insure easy steering and simultaneous turning of the front wheels uniformly in the same direction when actuated by either the main steering wheel or the auxiliary steering wheel.

Other objects and advantages of the invention will become apparent from the following description when taken in conjunction with the accompanying claims and drawings.

Referring to the drawings, in which are shown several preferred embodiments of the invention:

Figure 1 is a plan view of the chassis frame of a motor vehicle showing the improved dual steering mechanism associated therewith;

Figure 2 is a detail longitudinal view with parts in section of the tubular member or housing showing the adjustable connection of the steering links therewith;

Figure 3 is an enlarged sectional view taken substantially along the line 3—3 of Figure 2;

Figure 4 is a plan view of a modified form of the invention;

Figure 5 is a detail side view of the tubular member and the steering links shown in Figure 4;

Figure 6:
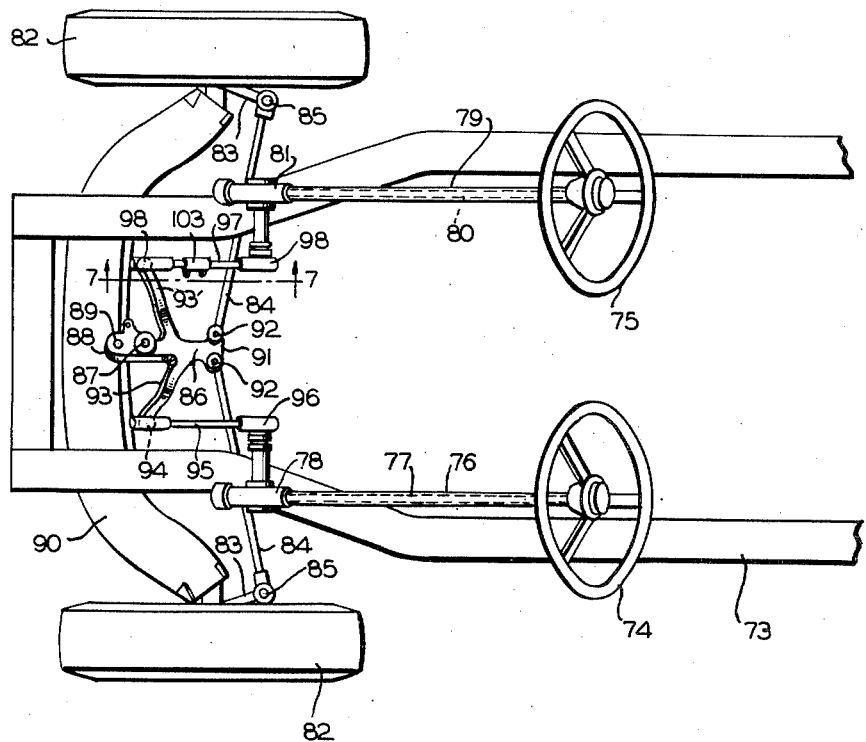
Figure 6 is a plan view of further modified form of the invention.

Referring to the drawings, Fig. 1, 10 designates the chassis or frame of a motor vehicle, 11 the front steering wheels, 12 the spring supporting structure, and 13 the steering spindle having the rearwardly extending steering arms 14, all of well known conventional character.

In order to insure proper parallel alignment of the front wheels in synchronization with the dual steering wheels and their uniform and simultaneous turning when the vehicle is provided with a dual control steering mechanism, a tubular member or elongated open-ended housing 15 is associated with the steering mechanism. The sleeve or housing 15 extends transversely of the vehicle adjacent the front wheels 11 and is formed with an axial bore 16 having oppositely disposed threaded portions 17 and 18 provided with longitudinally extending slits 19 (Fig. 2). Clamping collars 20 encircle the yieldable end portions of the housing 15 and are provided with spaced parallel end lugs or flanges 21 through each of which extends a threaded bolt 22 for receiving a retaining nut 23 (Fig. 3) for a purpose subsequently to be described. Steering links or rods 24 have their inner ends threaded as at 25 so as to engage the threads in the opposite ends of the housing 15 in order to be axially adjustable relative thereto, and are maintained in a fixed position by the tightening of the nuts 23 on the bolts 22 so as to force the split-end portions of the sleeve into firm clamping engagement therewith.

The steering spindle arms 14 are pivotally connected as at 26 to the outer ends of the drag links or tie rods 27 and the inner ends of the drag links may be formed with enlarged heads 28 provided with threaded recesses that register with transverse openings 29 in the links 24 and through which extend the threaded bolts 30 so as to rigidly secure the drag links 27 to the steering links 24. A main steering gear box 31 is connected to one side of the vehicle adjacent the front thereof, and may have mounted therein a conventional steering gear mechanism generally indicated as at 32 operatively connected by arm 38 to the outer end of adjacent link 24 as at 40. A main steering column 33 extends rearwardly from the box 31 and has rotatably mounted therein a main steering shaft 34 which is connected at its lower end to the steering gear mechanism 32 and at its opposite end to the steering wheel 35 adjacent the driver's seat. An auxiliary steering gear box 36 is connected to the opposite side of the vehicle and is provided with an auxiliary gear mechanism 37 having an arm 39 extending outwardly therefrom and connected as at 40' to the adjacent steering link 24. An auxiliary steering column 41 is connected to the gear box 36 and has rotatably mounted therein an auxiliary steering shaft 42 connected at its lower end to the auxiliary steering mechanism 37 and at its opposite end to an auxiliary steering wheel 43. It will be seen that by reason of the axial and independent adjustment of the steering links 24 relative to the housing 15, that simple, efficient and positive means are provided for properly aligning the front wheels in synchronization with the dual steering wheels, and adjustably maintaining them in proper balanced position so as to prevent shimmying and undesirable vibrations and unbalance being imparted to the dual steering mechanism. Thus, if for any reason it be necessary to lengthen or shorten one of the links 24, this may be readily effected by the threaded connection of the link with the housing 15 and this connection is maintained in a fixed position through the instrumentality of the clamping collars 20 which, upon tightening of the nut 23 on the bolt 22, will insure the yieldable split-end portions of the sleeve being clamped into firm locking engagement with the adjacent threaded portion of the adjacent link 24. If at any time during the operation of the vehicle the front wheels should work out of alignment in relation to the dual steering mechanism, they may be readily reset, by loosening the clamping collars 20 so as to lengthen or shorten the links as conditions may require and then locking the clamping members in a fixed position when the proper length has been determined.

The main steering wheel 35 and the auxiliary wheel 43 are both operatively connected to the front wheels through their associated steering mechanism, so that upon turning either one of the steering wheels, the front wheels 11 will simultaneously and uniformly be turned through the proper angle in order that no unnecessary wear is imposed upon the front tires of the vehicle. Moreover, the balanced connection of the main steering mechanism with the auxiliary steering mechanism insures an even equalizing application of stress and strain upon the steering mechanism, so that normally the front wheels 11 will move in a straight and parallel direction, but are quickly responsive to being turned upon the actuation of either the wheel 35 or 43.

The axial adjustable means provides an essential adjustment between the main steering box 31 and the auxiliary steering box 36 to permit synchronization of the turning radius in either direction, and also serves to center the gearing in the boxes on high-point with the front wheels in straight ahead position, thus rendering the car safely operable without binding at the high-point and without danger of the gearing locking in extreme right or left positions should the gearing reach the stop position first.

In the modified form of the invention shown in Figures 4 and 5, the front wheels 36' of the motor vehicle 37' are provided with the conventional steering spindle arms 38' and 39', respectively. A main steering box 40' is connected as at 41' to one side of the vehicle frame or chassis 37' and has extending outwardly therefrom a pitman 42' having diverging arms 43' and 44 and an outwardly extending straight arm 45. A short tie rod or link 46 is pivotally connected at its outer end as at 47 to the spindle arm 38' and has its opposite inner end pivotally connected as at 48 to the arm 43'. A long tie rod 49 is connected at its inner end as at 50 to the arm 44 and at its opposite end is connected as at 51 to the spindle arm 39'. A main steering column 52 is connected to the steering gear box 40' and has rotatably mounted therein a steering shaft 53 which is connected to the main steering wheel 54 positioned adjacent the seat of the driver.

An auxiliary steering gear box 55 is bolted as at 56 to the side of the frame 37' opposite to the gear box 40 and has extending outwardly therefrom an arm 57, operatively connected to the gearing mechanism therein. Positioned between the arms 45 and 57 (Fig. 4) is a tubular housing or sleeve 58 having its end portions longitudinally split as at 59 and provided with a through-bore formed with oppositely internally threaded portions 60 and 61 (Fig. 5) which are arranged to receive the complementary threaded inner end portions 62 and 63 of the links 64 and 65. Clamping collars 66 encircle the split ends of the housing 58 and have parallel end portions 67 provided with openings for receiving the threaded bolts 68 and the retaining nut 69, so that when the links 64 are properly adjusted as to length relative to the housing 58, they may be maintained in a fixed position by the tightening up of the nut 69 on the bolts 68, in substantially the same manner as the sleeve 15 and collars 20, previously described. An auxiliary steering column 70 extends rearwardly from the gear box 55 and has rotatably mounted therein a steering shaft 71 to which the auxiliary steering wheel 72 is connected. Thus, it will be seen that the longitudinal adjustment of the threaded links 64 and 65 relative to the housing 58 insures the proper alignment of the front wheels 36' in synchronization with the dual steering wheels, so that upon turning either the main steering wheel 54 or the auxiliary steering wheel 72, the front wheels are uniformly and simultaneously turned in either direction and without requiring much physical effort on the part of the driver. The operative connection of the pitman 42' with the short tie rod 46 and the long tie rod 49, insures proper steering operation from the right side of the vehicle and also provides steering stability so essential in dual control operation. Moreover, the axially adjustable means provides a balanced connection between the front wheels which is responsive to slight turning movement by the operation of either the primary steering wheel 53 or the auxiliary wheel 72.

Figure 7:
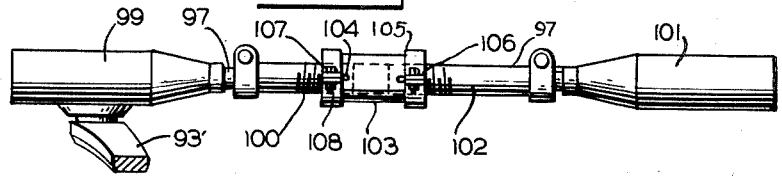
Figure 7 is a detail view taken substantially along the line 7—7 of Figure 6.

In the modified form of the invention disclosed in Figs. 6 and 7, the dual control steering mechanism is shown associated with a motor vehicle 73 having a main steering wheel 74 and an auxiliary steering wheel 75. The main steering wheel 74 is connected to a steering shaft 76 rotatably mounted in the sleeve 77 and extends into a steering gear box or housing 78. Similarly, the auxiliary steering wheel 75 is connected to an auxiliary steering shaft 79 mounted in sleeve 80 so as to project into an auxiliary steering gear box 81. The front wheels 82 are provided with the conventional steering spindle 83 which is pivotally connected to the drag links 84 as at 85. A steering pitman 86 is pivotally connected at one end as at 87 to a bracket 88 secured by a bolt 89 to a transverse member 90. The opposite end of the pitman 86 may have an enlarged head 91 to which are pivotally connected the drag links 84 as at 92. The pitman 86 has extending laterally from one side thereof a short arm 93 which is secured by a ball and socket connection 94 to a steering link 95 that is connected as at 96 to the gear box 78. The pitman 86 is also provided with a relatively long arm 93' extending from the side opposite to the arm 93 and secured by a ball and socket connection 98 to an auxiliary steering link 97 which in turn is connected as at 98 to the auxiliary gear housing 81. The auxiliary steering link 97 is preferably of sectional form so as to include a portion 99 (Fig. 7) having a threaded inner end 100 and a complementary spaced aligned portion 101 having a threaded end 102. Between the auxiliary aligned opposed threaded ends 100 and 102 is positioned a tubular housing or sleeve 103 having its end portions longitudinally split as at 104 and provided with a through bore formed with oppositely internally threaded portions for receiving the complementary threaded inner ends 100 and 102, respectively, of the sectional drag link 97. Clamping collars 105 encircle the split ends 104 and have parallel end portions 106 provided with openings for receiving the threaded bolts 107 and retaining nuts 108 so that when the sections 99 and 101 of the auxiliary link 97 are properly adjusted as to length they may be maintained in a fixed position by tightening of the nuts 108 on the bolts 107. Thus, simple and efficient means are provided for aligning the front wheels 82 in synchronization with the dual steering mechanism so that upon turning of either the main steering wheel 74 or the auxiliary steering wheel 75 in either direction the vehicle can be conveniently operated by the operator or the auxiliary driver. Manifestly the link 95 may, if desired, be formed of adjustable sections similar to link 97. The lever of the long arm 93' is above the lever of the short arm 93 and of unequal proportions so as to increase the steering efficiency and stability of the dual control mechanism. Moreover, the unequal length and different levels of the arms 93 and 93' of the pitman 86 provides means which preclude the pitman assembly from moving in a horizontal plane.

It will be understood that the forms of the invention shown and described are merely illustrative of preferred embodiments and that such changes may be made to the steering assembly as come within the scope of the following claims.

I claim:

1. Dual control steering mechanism for the front wheels of a vehicle comprising a primary steering wheel on the driver's side of the vehicle, an auxiliary steering wheel on the opposite side of the vehicle, a primary gear box connected to said primary steering wheel for operation thereby, a primary actuating arm extending from said primary gear box, an auxiliary gear box connected to said auxiliary steering wheel for operation thereby, an auxiliary actuating arm extending from said auxiliary gear box, an adjustable link connecting said primary actuating arm and said auxiliary actuating arm, said adjustable link comprising a rod having one end pivotally connected to said primary actuating arm and the opposite end threadedly engaging a split sleeve, a second rod having one end pivotally connected to said auxiliary actuating arm and the opposite end threadedly engaging said split sleeve and clamping collars on said split sleeve for securing said rods in adjusted position with relation to said split sleeve, a link connected to the steering knuckle of one front wheel and said first rod and a second link connected to the steering knuckle of the other front wheel and to said second rod whereby upon adjustment of said first rod with respect to said sleeve, the angular position of said primary actuating arm, the position of the primary gear box elements connected thereto and the associated wheel will be adjusted independently of the angular position of said auxiliary actuating arm, the position of the auxiliary gear box elements connected thereto and the associated wheel, and upon adjustment of said second rod with respect to said sleeve, the angular position of said auxiliary actuating arm, the position of the auxiliary gear box elements connected thereto and the associated wheel will be adjusted independently of the angular position of said primary actuating arm, the position of the primary gear box elements connected thereto and the associated wheel.

2. Dual control steering mechanism for the front wheels of a vehicle comprising a primary steering wheel on the driver's side of the vehicle, an auxiliary steering wheel on the opposite side of the vehicle, a primary gear box connected to said primary steering wheel for operation thereby a primary actuating arm extending from said primary gear box, an auxiliary gear box connected to said auxiliary steering wheel for operation thereby, an auxiliary actuating arm extending from said auxiliary gear box, an adjustable link connecting said primary actuating arm and said auxiliary actuating arm, said adjustable link comprising a rod having an end pivotally connected to said primary actuating arm and the opposite end threadedly engaging a sleeve, a second rod having one end pivotally connected to said auxiliary actuating arm and the opposite end engaging said sleeve, and means for securing said rods in adjusted position with relation to said sleeve, a link connected to the steering knuckle of one front wheel and to said first rod and a second link connected to the steering knuckle of the other front wheel and to said second rod, whereby upon adjustment of said first rod with respect to said sleeve, the angular position of said primary actuating arm, the position of the primary gear box elements connected thereto and the associated wheel will be adjusted independently of the angular position of said auxiliary actuating arm and the associated wheel, and upon adjustment of said second rod with respect to said sleeve, the angular position of said auxiliary actuating arm, the position of the auxiliary gear box elements connected thereto and the associated wheel will be adjusted independently of the angular position of said primary actuating arm, the position of the primary gear box elements connected thereto and the associated wheel.

3. Dual control steering mechanism for the front wheels of a vehicle comprising a primary steering wheel on the driver's side of the vehicle, an auxiliary steering wheel on the opposite side of the vehicle, a primary gear box connected to said primary steering wheel for operation thereby, a primary actuating arm extending from said primary gear box, an auxiliary gear box connected to said auxiliary steering wheel for operation thereby, an auxiliary actuating arm extending from said auxiliary gear box, an adjustable link connecting said primary actuating arm and said auxiliary actuating arm, said adjustable link comprising a rod having one end pivotally connected to said primary actuating arm, a second rod having one end pivotally connected to said auxiliary actuating arm, and means adjustably connecting said first and second rods, a link connected to the steering knuckle of one front wheel and to said first rod and a second link connected to the steering knuckle of the other front wheel and to said second rod whereby upon adjustment of said first rod with respect to said second rod, the angular position of said primary actuating arm, the position of the primary gear box elements connected thereto and the associated wheel will be adjusted independently of the angular position of said auxiliary actuating arm, the position of the auxiliary gear box elements connected thereto and the associated wheel, and upon adjustment of said second rod with respect to said first rod, the angular position of the said auxiliary actuating arm, the position of the auxiliary gear box elements connected thereto and the associated wheel will be adjusted independently of the angular position of said primary actuating arm, the position of the primary gear box elements connected thereto and the associated wheel.

References Cited in the file of this patent

UNITED STATES PATENTS

| Number | Name | Date |
|---|---|---|
| 938,783 | Palmer | Nov. 2, 1909 |
| 2,049,502 | Hufferd et al. | Aug. 4, 1936 |
| 2,144,162 | Leighton | Jan. 17, 1939 |
| 2,153,862 | Cowles | Apr. 11, 1939 |
| 2,175,429 | Chayne | Oct. 10, 1939 |
| 2,406,261 | Sprinkel | Aug. 20, 1946 |
| 2,464,982 | Leighton | Mar. 22, 1949 |
| 2,508,686 | Rice | May 23, 1950 |
| 2,512,876 | Rice | June 27, 1950 |